United States Patent
Santhar et al.

(10) Patent No.: US 12,407,848 B2
(45) Date of Patent: Sep. 2, 2025

(54) PREDICTING A NEXT FRAME FOR A VIDEO USING ENSEMBLING

(71) Applicant: International Business Machines Corporation, Armonk, NY (US)

(72) Inventors: Sathya Santhar, Ramapuram (IN); Sarbajit K. Rakshit, Kolkata (IN); Sridevi Kannan, Chennai (IN); Suvedhahari Velusamy, Irving, TX (US)

(73) Assignee: International Business Machines Corporation, Armonk, NY (US)

( * ) Notice: Subject to any disclaimer, the term of this patent is extended or adjusted under 35 U.S.C. 154(b) by 2 days.

(21) Appl. No.: 18/455,706

(22) Filed: Aug. 25, 2023

(65) Prior Publication Data

US 2025/0071311 A1   Feb. 27, 2025

(51) Int. Cl.
*H04N 19/50* (2014.01)
*H04N 19/172* (2014.01)

(52) U.S. Cl.
CPC ........... *H04N 19/50* (2014.11); *H04N 19/172* (2014.11)

(58) Field of Classification Search
CPC .............................. H04N 19/50; H04N 19/172
USPC ..................................................... 375/240.12
See application file for complete search history.

(56) References Cited

U.S. PATENT DOCUMENTS

| | | |
|---|---|---|
| 2021/0199850 A1 | 7/2021 | Schmude et al. |
| 2022/0012640 A1 | 1/2022 | Iyengar et al. |
| 2022/0189171 A1 | 6/2022 | Fan et al. |
| 2023/0005269 A1* | 1/2023 | Kim ......... G06V 10/82 |
| 2023/0055636 A1 | 2/2023 | Cheng et al. |
| 2023/0308823 A1* | 9/2023 | Jansen .......... G06N 3/045 |

FOREIGN PATENT DOCUMENTS

WO     2025/045470 A1    3/2025

OTHER PUBLICATIONS

Hosseini, et al, "Inception-inspired LSTM for Next-frame Video Prediction", zrXiv preprint, 2020, 7 pages., United States of America.
Kwon, et al, "Predicting Future Frames Using Retrospective Cycle GAN", Proceedings of the IEEE/CVF Conference on Computer Vision and Pattern Recognition (CVPR), 2019, pp. 1811-1820., United States of America.
Desai et al. "Next Frame Prediction Using ConvLSTM", Journal of Physics Conference Series, Jan. 2022, vol. 2161, Issue No. 1, 012024 (15 pages).

(Continued)

*Primary Examiner* — Allen C Wong
(74) *Attorney, Agent, or Firm* — CANTOR COLBURN LLP; Jordan Schiller

(57) ABSTRACT

A computer-implemented method for predicting a next frame for a video is provided. Aspects include obtaining the video having a sequence of frames, obtaining a plurality of machine learning models (MLMs) that are trained to perform next frame prediction, and inputting a subset of the sequence of frames into each of the plurality of MLMs. Aspects also include calculating, for the subset of the sequence of frames, a score for each of the plurality of MLMs and generating, using one of the plurality of MLMs having a highest score, the next frame, where the next frame is a frame immediately subsequent to the subset of the sequence of frames.

20 Claims, 6 Drawing Sheets

(56) References Cited

OTHER PUBLICATIONS

International Searching Authority, "Notification of Transmittal of the International Search Report and the Written Opinion of the International Searching Authority, or Declaration," Patent Cooperation Treaty, Nov. 21, 2024, 13 pages, International Application No. PCT/EP2024/071246.
Kim et al. "Adaptive Future Frame Prediction with Ensemble Network", arXiv:2011.06788v2 [cs. CV], Nov. 16, 2020, 15 pages.
Riquelme et al, "Scaling Vision with Sparse Mixture of Experts", arXiv:2106.05974v1 [cs.CV], Jun. 10, 2021, 43 pages.
Shaabana et al. "Video Relationship Detection Using Mixture of Experts", arXiv:2403.03994, Mar. 6, 2024, 15 pages.

\* cited by examiner

PREDICTING A NEXT FRAME FOR A VIDEO USING ENSEMBLING

BACKGROUND

The present invention generally relates to video processing, and more specifically, to predicting a next frame for a video using ensembling.

There has been a large increase in the use and distribution of videos for entertainment, communication, and education purposes. As a result, there has also been an increase in the need to accurately generate and predict a next video frame for a given sequence of video frames. In general, next frame prediction is built on the understanding that the information in the historical images can be used to predict the content of a future image. Next frame prediction models receive an input of unlabeled video frames and utilized a trained network to generate one or more subsequent frames.

Several next frame prediction models have recently been developed. In general, each of the available next frame prediction models is best suited for predicting next frames for certain types of videos. For example, one type of next frame prediction model may be constructed to accurately predict a next frame for a series of frames including a human in motion and another type of next frame prediction model may be constructed to accurately predict a next frame for a series of frames including the movement of machines or animals in nature.

SUMMARY

Embodiments of the present invention are directed to a computer-implemented method for predicting a next frame for a video using ensembling. The computer-implemented method includes obtaining the video having a sequence of frames, obtaining a plurality of machine learning models (MLMs) that are trained to perform next frame prediction, and inputting a subset of the sequence of frames into each of the plurality of MLMs. The method also includes calculating, for the subset of the sequence of frames, a score for each of the plurality of MLMs and generating, using one of the plurality of the MLMs having a highest score, the next frame, where the next frame is a frame immediately subsequent to the subset of the sequence of frames.

Embodiments of the present invention are directed to a computer program product for predicting a next frame for a video using ensembling. The computer program product includes one or more computer readable storage media having computer readable program code collectively stored on the one or more computer readable storage media. The computer readable program code is executed by a processor of a computer system to cause the computer system to perform operations. The operations include obtaining the video having a sequence of frames, obtaining a plurality of machine learning models (MLMs) that are trained to perform next frame prediction, and inputting a subset of the sequence of frames into each of the plurality of MLMs. The operations also include calculating, for the subset of the sequence of frames, a score for each of the plurality of MLMs and generating, using one of the plurality of the MLMs having a highest score, the next frame, where the next frame is a frame immediately subsequent to the subset of the sequence of frames.

Embodiments of the present invention are directed to a computing system including a processor, a memory coupled to the processor and one or more computer readable storage media coupled to the processor. The one or more computer readable storage media collectively contain instructions that are executed by the processor via the memory to cause the processor to perform operations. The operations include obtaining the video having a sequence of frames, obtaining a plurality of machine learning models (MLMs) that are trained to perform next frame prediction, and inputting a subset of the sequence of frames into each of the plurality of MLMs. The operations also include calculating, for the subset of the sequence of frames, a score for each of the plurality of MLMs and generating, using one of the plurality of the MLMs having a highest score, the next frame, where the next frame is a frame immediately subsequent to the subset of the sequence of frames.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
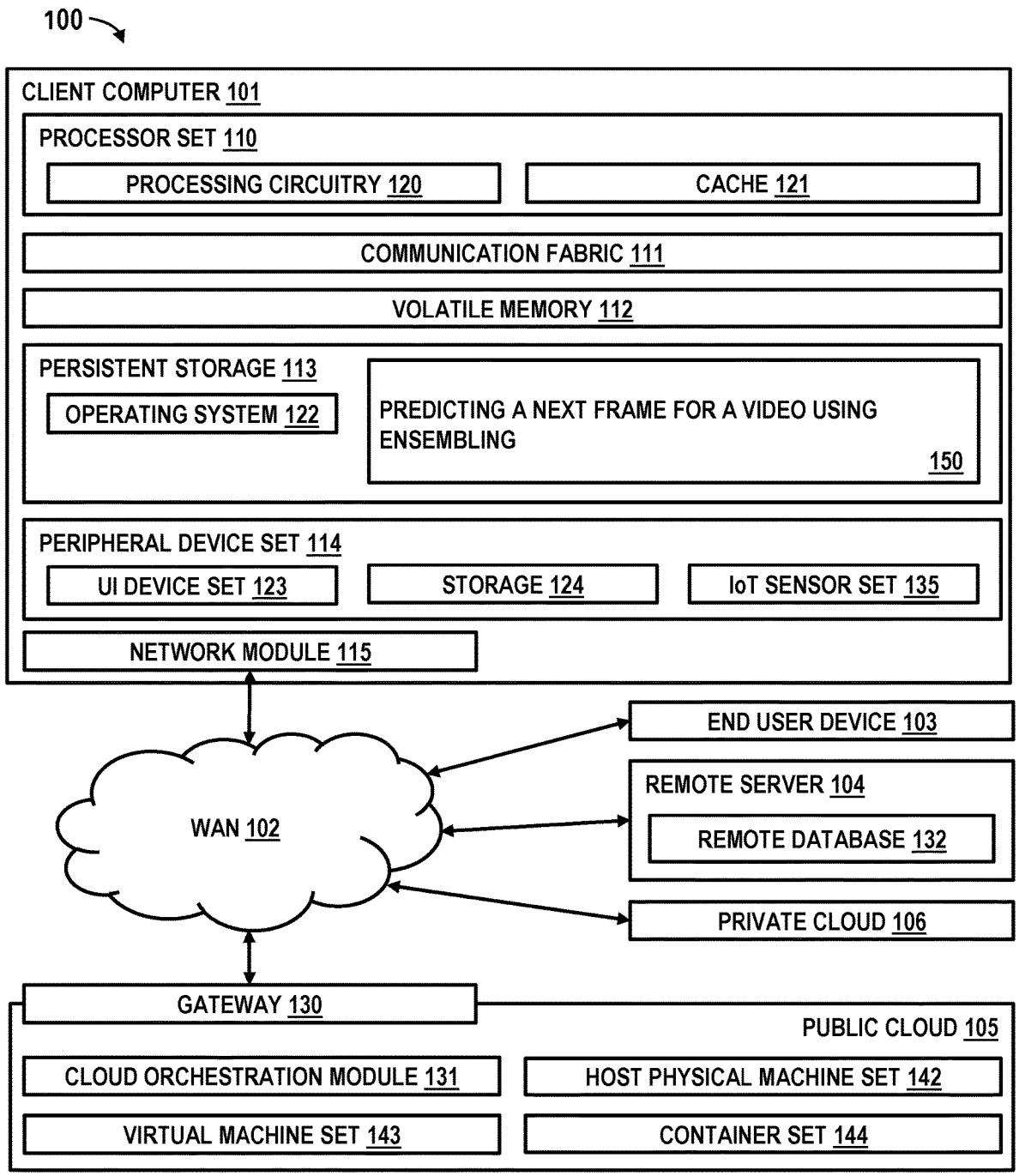
FIG. 1 is a schematic diagram of a computing environment in accordance with one or more embodiments of the present invention.

The diagrams depicted herein are illustrative. There can be many variations to the diagram or the operations described therein without departing from the spirit of the invention. For instance, the actions can be performed in a differing order, or actions can be added, deleted, or modified. Also, the term "coupled" and variations thereof describes having a communications path between two elements and does not imply a direct connection between the elements with no intervening elements/connections between them. All of these variations are considered a part of the specification.

DETAILED DESCRIPTION

Embodiments of the present invention are directed to a computer-implemented method for predicting a next frame for a video using ensembling. The computer-implemented method includes obtaining the video having a sequence of frames, obtaining a plurality of machine learning models (MLMs) that are trained to perform next frame prediction, and inputting a subset of the sequence of frames into each of the plurality of MLMs. The method also includes calculating, for the subset of the sequence of frames, a score for each of the plurality of MLMs and generating, using one of the plurality of the MLMs having a highest score, the next frame, where the next frame is a frame immediately subsequent to the subset of the sequence of frames. One technical benefit of selectively using the identified MLM for generating the next frame is that the accuracy of the prediction for each frame of the video is optimized.

Additionally, or alternatively, in embodiments of the present invention each of the plurality of MLMs has an accuracy. As a result, both the overall accuracy of each MLM and the accuracy of each MLM in predicting each frame is considered in selecting the MLM to use for next frame generation.

Additionally, or alternatively, in embodiments of the present invention calculating the score for each of the plurality of MLMs comprises calculating a frame loss value for each of the subset of the sequence of frames by comparing a ground truth frame from the subset of the sequence of frames with a predicted frame generated by a corresponding MLM of the plurality of MLMs. One technical benefit of calculating frame loss value for each of the subset of the sequence of frames is being able to identify trends in the performance of each MLM over time, which can be used to select the best MLM for generating a next frame.

Additionally, or alternatively, in embodiments of the present invention calculating the score for each of the plurality of MLMs further comprises calculating an overall loss value for each of the plurality of MLMs based on the frame loss values for each of the subset of the sequence of frames corresponding to the MLM of the plurality of MLMs. One technical benefit of calculating overall loss value for each of the plurality of MLMs is simplifying the process of comparing the performance of the various MLMs, i.e., not having to compare the frame loss values individually for each MLM.

Additionally, or alternatively, in embodiments of the present invention calculating the score for each of the plurality of MLMs further comprises calculating an overall loss value for each of the plurality of MLMs by summing the frame loss values for each of the subset of the sequence of frames corresponding to the MLM of the plurality of MLMs. One technical benefit of calculating overall loss value for each of the plurality of MLMs is simplifying the process of comparing the performance of the various MLMs, i.e., not having to compare the frame loss values individually for each MLM.

Additionally, or alternatively, in embodiments of the present invention calculating the score for each of the plurality of MLMs further comprises multiplying the overall loss value corresponding to the MLM of the plurality of MLMs by the accuracy corresponding to the MLM of the plurality of MLMs. One technical benefit of using both the accuracy and overall loss value of each MLM and the accuracy of each MLM in predicting each frame is considered in selecting the MLM to use for next frame generation.

Additionally, or alternatively, in embodiments of the present invention the plurality of MLMs include a long short-term memory (LSTM) model, a convolutional neural network (CNN) model, and a gated recurrent unit (GRU) model. One technical benefit of utilizing a variety of MLM types is increased accuracy of the predicted next frame, as each model type will have different performance characteristics.

Additionally, or alternatively, in embodiments of the present invention updating a metadata of the video to include an indication of the one of the plurality of the MLMs having the highest score for predicting the next frame. One technical benefit of storing the indication of the one of the plurality of the MLMs having the highest score for predicting the next frame in the metadata is that metadata can be used to identify frames that can be dropped, and the MLM that should be used to generate the dropped frame, thereby allowing for compression of the video while minimizing degradation of the video during playback.

Embodiments of the present invention are directed to a computer program product for predicting a next frame for a video using ensembling. The computer program product includes one or more computer readable storage media having computer readable program code collectively stored on the one or more computer readable storage media. The computer readable program code is executed by a processor of a computer system to cause the computer system to perform operations. The operations include obtaining the video having a sequence of frames, obtaining a plurality of machine learning models (MLMs) that are trained to perform next frame prediction, and inputting a subset of the sequence of frames into each of the plurality of MLMs. The operations also include calculating, for the subset of the sequence of frames, a score for each of the plurality of MLMs and generating, using one of the plurality of the MLMs having a highest score, the next frame, where the next frame is a frame immediately subsequent to the subset of the sequence of frames.

Embodiments of the present invention are directed to a computing system including a processor, a memory coupled to the processor and one or more computer readable storage media coupled to the processor. The one or more computer readable storage media collectively contain instructions that are executed by the processor via the memory to cause the processor to perform operations. The operations include obtaining the video having a sequence of frames, obtaining a plurality of machine learning models (MLMs) that are trained to perform next frame prediction, and inputting a subset of the sequence of frames into each of the plurality of MLMs. The operations also include calculating, for the subset of the sequence of frames, a score for each of the plurality of MLMs and generating, using one of the plurality of the MLMs having a highest score, the next frame, where the next frame is a frame immediately subsequent to the subset of the sequence of frames.

As discussed above, several next frame prediction models have recently been developed and each of these next frame prediction models is designed to generate a predicted frame for a certain type of video. As a result, the accuracy of a predicted next frame for a video can vary based on the type of the video and the next frame prediction models used. In practice, a user may not be aware of the best next frame prediction model to use for a specific video. In addition, for videos containing multiple types of content, different portions of the video may be best suited to use different next frame prediction models.

In exemplary embodiments, systems, methods, and computer program products for predicting a next frame for a video using ensembling are provided. In exemplary embodiments, a plurality of next frame prediction models are constantly evaluated for an input video to continuously identify a model from the plurality of models that are best suited to perform next frame prediction for a given sequence of frames of the video. In exemplary embodiments, identifying the model from the plurality of models includes calculating a score for the sequence of frames based on a comparison of frames generated by each model to ground truth frames, i.e., actual frames of the sequence of frames. Once the best model for a sequence of frames is identified, the identified model is used to generate the predicted next frame for the sequence of frames. In exemplary embodiments, a metadata file of the video may be updated to include an identification of the identified machine learning model that is best suited for generating each frame in the video.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as predicting a next frame for a video using ensembling (block 150). In addition to block 150, computing environment 100 includes, for example, computer 101, wide area network (WAN) 102, end user device (EUD) 103, remote server 104, public Cloud 105, and private Cloud 106.

In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IOT) sensor set 125), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 142, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 131 manages the transfer and storage of images, deploys new instantiations of VCEs and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Figure 2:
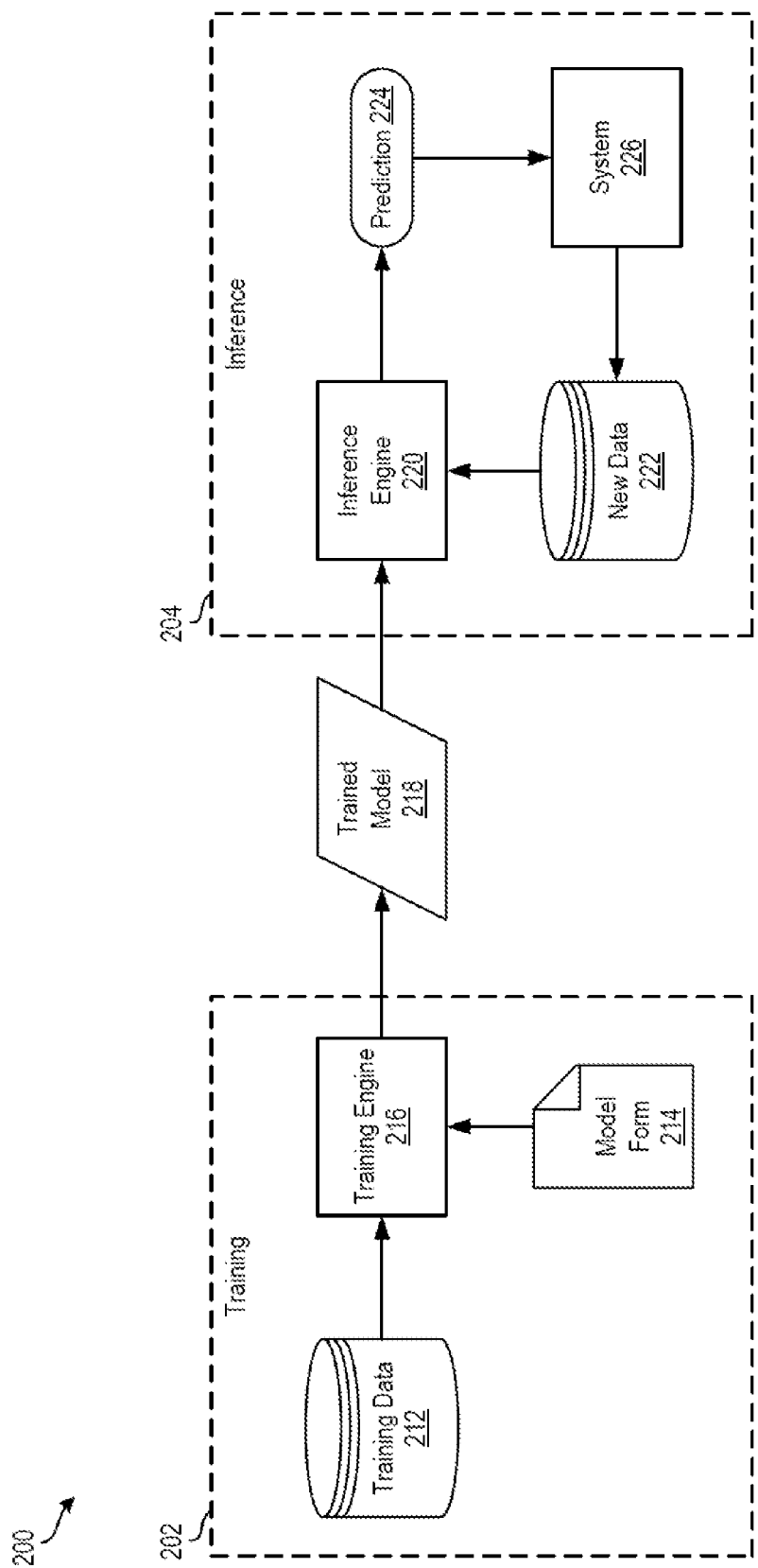
FIG. 2 is a block diagram of components of a machine learning training and inference system in accordance with one or more embodiments of the present invention.

Referring now to FIG. 2, a block diagram of components of a machine learning training and inference system 200 is shown. The machine learning training and inference system 200, in accordance with one or more embodiments of the invention, can utilize machine learning techniques to perform tasks, such as generating a predicted next frame for a video. Embodiments of the invention utilize AI, which includes a variety of so-called machine learning technologies. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for managing information. In one or more embodiments of the present invention, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments of the invention described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was input. It should be appreciated that these same techniques can be applied in the case of localizing a target object referred by a compositional expression from an image set with similar visual elements as described herein.

GANs are an exciting recent innovation in machine learning and typically use an approach towards generative modelling using deep learning methods, such as CNNs. GANs are a clever way of training a generative model by framing the problem as a supervised learning problem with two sub-models: the generator model that we train to generate new examples and the discriminator model that tries to classify examples as either real (from the domain) or fake (generated). The two models are trained together in a zero-sum adversarial game until the discriminator model is fooled about half the time, meaning the generator model is generating plausible examples.

The machine learning training and inference system 200 performs training 202 and inference 204. During training 202, a training engine 216 trains a model (e.g., the trained model 218) to perform a task. Inference 204 is the process of implementing the trained model 218 to perform the task in the context of a larger system (e.g., a system 226).

The training 202 begins with training data 212, which can be structured or unstructured data. The training engine 216 receives the training data 212 and a model form 214. The model form 214 represents a base model that is untrained. The model form 214 can have preset weights and biases, which can be adjusted during training. It should be appreciated that the model form 214 can be selected from many different model forms depending on the task to be performed. For example, where the training 202 is to train a model to perform image classification, the model form 214 can be a model form of a CNN (convolutional neural network). The training 202 can be supervised learning, semi-supervised learning, unsupervised learning, reinforcement learning, and/or the like, including combinations and/or multiples thereof. For example, supervised learning can be used to train a machine learning model to classify an object of interest in an image. To do this, the training data 212 includes labeled images, including images of the object of interest with associated labels (ground truth) and other images that do not include the object of interest with associated labels. In this example, the training engine 216 takes as input a training image from the training data 212, makes a prediction for classifying the image, and compares the prediction to the known label. The training engine 216 then adjusts weights and/or biases of the model based on the results of the comparison, such as by using backpropagation. The training 202 can be performed multiple times (referred to as "epochs") until a suitable model is trained (e.g., the trained model 218).

Once trained, the trained model 218 can be used to perform inference 204 to perform a task. The inference engine 220 applies the trained model 218 to new data 222 (e.g., real-world, non-training data). For example, if the trained model 218 is trained to classify images of a particular object, such as a chair, the new data 222 can be an image of a chair that was not part of the training data 212. In this way, the new data 222 represents data to which the model 218 has not been exposed. The inference engine 220 makes a prediction 224 (e.g., a classification of an object in an image of the new data 222) and passes the prediction 224 to the system 226. The system 226 can, based on the prediction 224, taken an action, perform an operation, perform an analysis, and/or the like, including combinations and/or multiples thereof. In some embodiments of the invention, the system 226 can add to and/or modify the new data 222 based on the prediction 224.

In accordance with one or more embodiments of the present invention, the predictions 224 generated by the inference engine 220 are periodically monitored and verified to ensure that the inference engine 220 is operating as expected. Based on the verification, additional training 202 can occur using the trained model 218 as the starting point. The additional training 202 can include all or a subset of the original training data 212 and/or new training data 212. In accordance with one or more embodiments of the invention, the training 202 includes updating the trained model 218 to account for changes in expected input data.

Video prediction is the task of predicting future frames given past video frames and is a component process of decompression for video playback. The ability to predict, anticipate, and reason about future outcomes is a key component of intelligent decision-making systems. Considering the success of deep learning in computer vision, deep-learning-based video prediction emerged as a promising research direction. Defined as a self-supervised learning task, video prediction represents a suitable framework for representation learning, as it demonstrated potential capabilities for extracting meaningful representations of the underlying patterns in natural videos. In many cases, next-frame prediction can be taken as a spatiotemporal problem. That is, given a sequence of images in continuous time steps, an ability to predict the next frame of a video is performed by time sequence learning.

Next-frame prediction architectures can be categorized into two main types. These include sequence-to-one architectures and sequence-to-many architectures. In sequence-to-one architectures, an immediate next frame is predicted using the sequence of previous frames (i.e., I/P: t frames; O/P: t+1 frame). In sequence-to-many architectures, next few frame sequences are predicted using the sequence of previous frames (i.e., I/P: t frames; O/P: t+k frames). Currently, it is seen that multiple network structures are used to build next-frame prediction models. Auto-encoders and generative adversarial networks (GANs) are widely used to generate an entirely new video (as in VIDEO SYNTHESIS) or to predict and generate the next-frame(s) given current and previous frames of a video (as in VIDEO PREDICTION).

Figure 3:
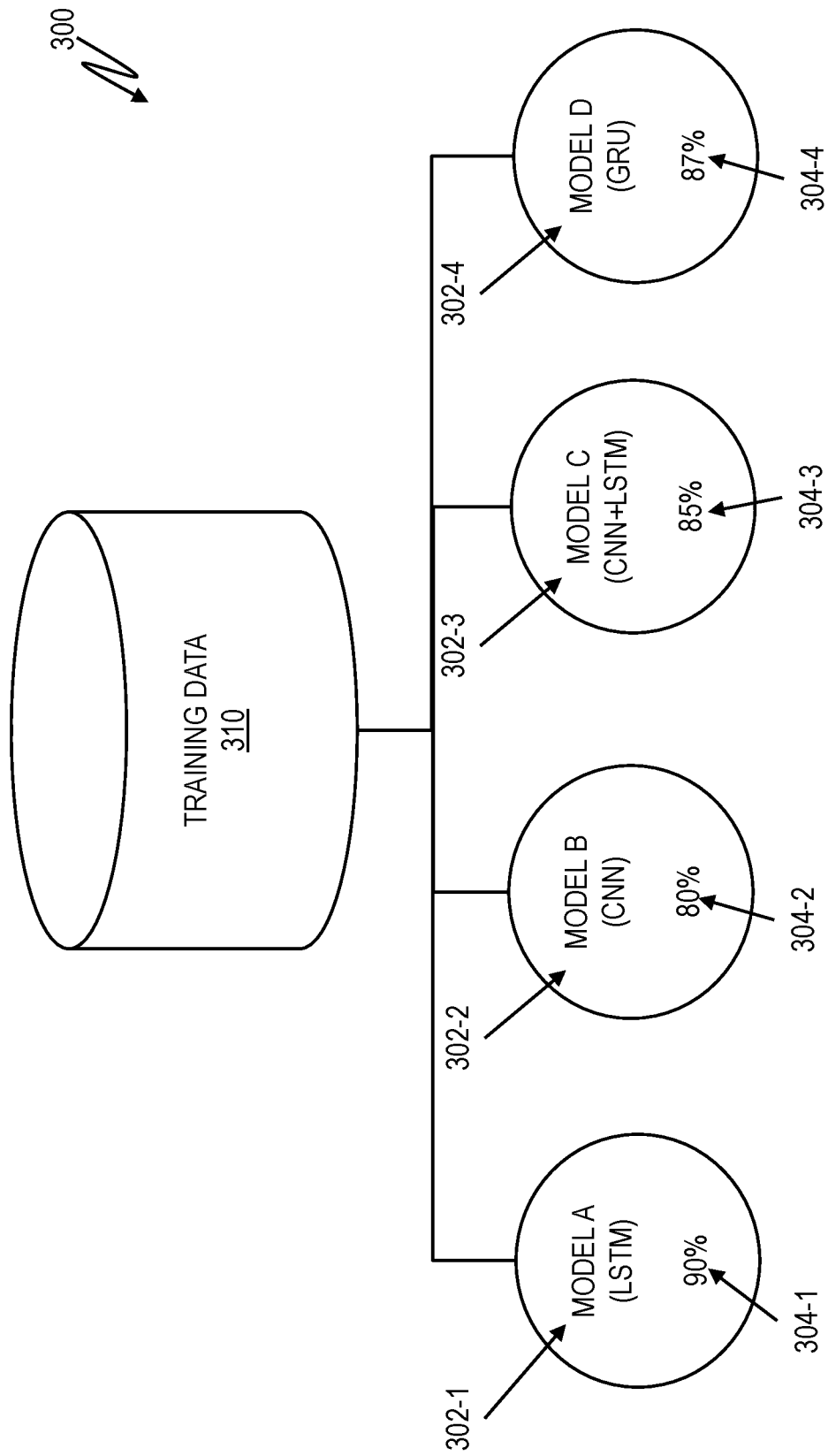
FIG. 3 is a schematic diagram illustrating training a plurality of machine learning models for performing next frame prediction in accordance with one or more embodiments of the present invention.

Referring now to FIG. 3, a schematic diagram illustrating training a plurality of machine learning models for performing next frame prediction in accordance with one or more embodiments of the present invention is shown. As illustrated, a set of training data 310 is utilized to train a plurality of trained machine learning models 302-1, 302-2, 302-3, and 302-4, referred to collectively as trained machine learning models 302, to perform next frame prediction. In exemplary embodiments, a training system 202 such as the one shown in FIG. 2 is used to train each of the trained machine learning models 302. In exemplary embodiments, each of the trained machine learning models 302-1, 302-2, 302-3, and 302-4 has a corresponding accuracy 304-1, 304-2, 304-3, and 304-4, referred to collectively as accuracy 304. In exemplary embodiments, the accuracy 304 of a trained machine learning model is calculated after the training of the machine learning model based on a standardized set of input videos. In exemplary embodiments, the trained machine learning models include a long short-term memory (LSTM) model, a convolutional neural network (CNN) model, and a gated recurrent unit (GRU) model. The trained machine learning models may also include models that are created by combining one or more of the LSTM, CNN, and GRU models.

Figure 4:
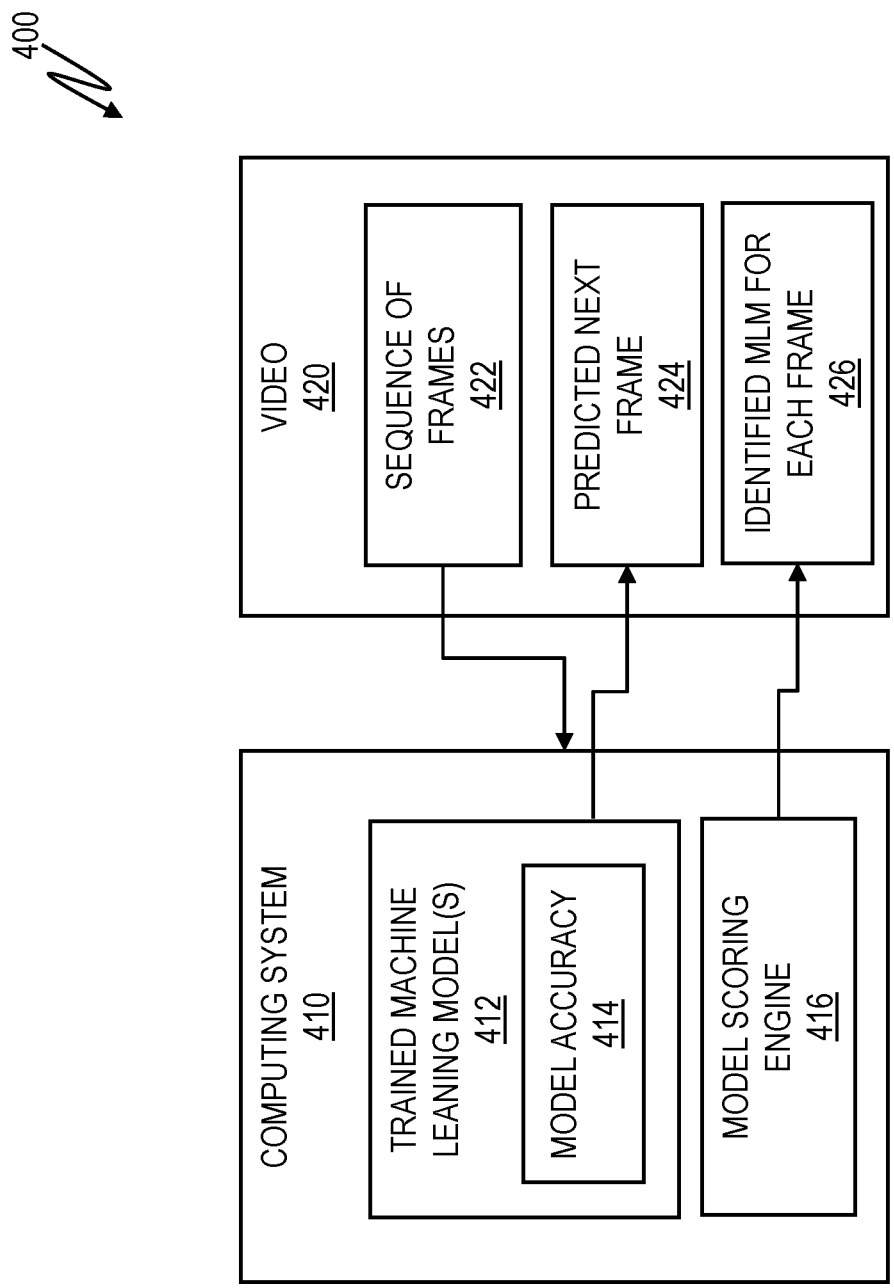
FIG. 4 is a block diagram illustrating a system for predicting a next frame for a video using ensembling in accordance with one or more embodiments of the present invention.

Referring now to FIG. 4, a block diagram illustrating a system 400 for predicting a next frame for a video using ensembling in accordance with one or more embodiments of the present invention is shown. As illustrated, the system 400 includes a computing system 410 that is configured to receive a sequence of frames 422 of a video 420 and to responsively generate a predicted next frame 424, where the predicted next frame 424 is a frame that is immediately subsequent to the sequence of frames 422.

In exemplary embodiments, the computing system 410 is embodied in a computer 101 such as the one shown in FIG. 1. The computing system 410 includes a plurality of trained machine learning models 412, that have each been trained to generate a next frame prediction based on an input sequence of video frames. Each of the trained machine learning models 412 has a corresponding accuracy 414, which reflects a calculated accuracy of the machine learning model 412 against a predefined set of videos. The computing system 410 also includes a model scoring engine 416 that is configured to calculate a score for each trained machine learning model 412 that reflects the accuracy of the trained machine learning model 412 for a given sequence of frames 422.

In exemplary embodiments, the model scoring engine 416 is configured to analyze the performance of each trained machine learning model 412 against a sequence of frames 422, or a subset of the sequence of frames 422. In one embodiment, the model scoring engine 416 calculates an individual loss value for one or more of the sequence of frames 422 by comparing a ground truth frame from the sequence of frames 422 with a corresponding predicted frame created using the trained machine learning model 412.

In one example, the sequence of frames includes five consecutive frames (frame 1, frame 2, frame 3, frame 4, and frame 5), and the model scoring engine 416 is configured to calculate individual loss values, corresponding to each trained machine learning model 412, for frame 2, frame 3, frame 4 and frame 5. The individual loss value for a frame is calculated based on the similarity of a predicted frame generated using each trained machine learning model 412 to the corresponding ground truth frame. In one example, if the similarity between two frames is 95% the individual loss value would be 5%. For example, a first trained machine learning model 412 (model A) is configured to generate predicted frame 2_A, predicted frame 3_A, predicted frame 4_A, and predicted frame 5_A, which are respectively compared with frame 2, frame 3, frame 4, and frame 5 to calculate the individual loss values for each of frames 2 through 5 for model A.

In exemplary embodiments, the model scoring engine 416 is configured to calculate an overall loss value for each trained machine learning model 412 based on the individual loss value for the sequence of frames 422 for the corresponding trained machine learning model 412. In one embodiment, the overall loss value for each trained machine learning model 412 is the sum of the individual loss value for the sequence of frames 422 for the corresponding trained machine learning model 412. In another embodiment, the overall loss value for each trained machine learning model 412 is the average of the individual loss value for the sequence of frames 422 for the corresponding trained machine learning model 412. In a further embodiment, the overall loss value for each trained machine learning model 412 is a weighted average of the individual loss value for the sequence of frames 422 for the corresponding trained machine learning model 412, where more recent frames are given a higher weight.

In exemplary embodiments, the model scoring engine 416 is configured to generate a score for each of the trained machine learning models 412, which reflects the accuracy of each trained machine learning model 412 in predicting a next frame for the provided sequence of frames 422 of the video 420. In one embodiment, the score for a trained machine learning model 412 is calculated by multiplying the model accuracy 414 corresponding to the trained machine learning model 412 by the overall loss value calculated for each trained machine learning model 412.

In exemplary embodiments, once the model scoring engine 416 is configured to identify a trained model from the plurality of trained machine learning models 412 that has the highest score. Based on obtaining the identification of the trained model from the model scoring engine 416, the computing system 410 is configured to utilize the identified trained machine learning model to generate the predicted next frame 424 of the video 420. In one embodiment, the video 420 may include metadata that includes the identified machine learning model 426 that is best suited to generate a predicted next frame for each frame.

In exemplary embodiments, the process of evaluating the best model for the sequence of frames is continuously performed across the sequence of frames 422 of the video 420. For example, a video may include one hundred frames, and the frames are constantly evaluated to identify the machine learning model that is best suited to generate a predicted next frame for each frame. In one example, a first model (model A) may be identified as the best model to generate a next frame for frames 1-20 and 78-100, a second model (model B) may be identified as the best model to generate a next frame for frames 21-50, and a third model (model C) may be identified as the best model to generate a next frame for frames 51-77. This data may be stored in the metadata of the video 420. As a result, when a processing system is playing back the video 420 and a frame is corrupt or missing (either accidently or intentionally), the processing system will be able to identify the best machine learning model to use to generate the frame.

Figure 5:
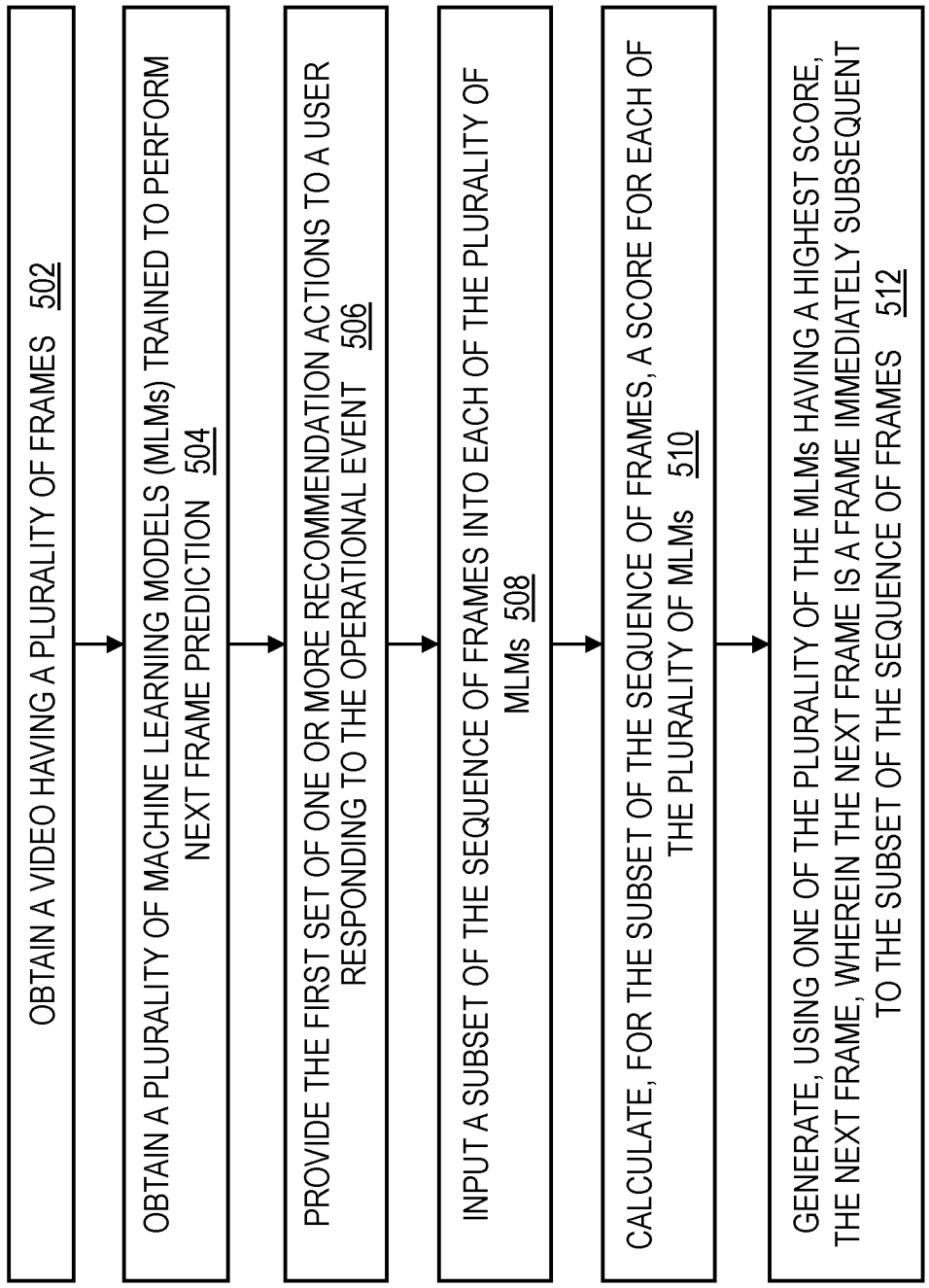
FIG. 5 is a flow diagram illustrating a computer-implemented method for predicting a next frame for a video using ensembling in accordance with one or more embodiments of the present invention.

Referring now to FIG. 5, a flow diagram illustrating a computer-implemented method 500 for predicting a next frame for a video using ensembling in accordance with one or more embodiments of the present invention is shown. In exemplary embodiments, the method 500 is performed by a computing system 410, such as the one shown in FIG. 4. At block 502, the method 500 begins by obtaining the video having a sequence of frames. Next, the method 500 includes obtaining a plurality of machine learning models (MLMs) that are trained to perform next frame prediction, as shown at block 504. In exemplary embodiments, the plurality of machine learning models include a long short-term memory (LSTM) model, a convolutional neural network (CNN) model; and a gated recurrent unit (GRU) model. In one embodiment, the plurality of machine learning models include a combination of two or more of an LSTM model, a CNN model, and a GRU model.

At block 506, the method 500 includes inputting a subset of the sequence of frames into each of the plurality of MLMs. In one example, the subset includes a predetermined number of frames of the sequence of frames. For example, while a video including hundreds of frames the subset may include only ten or fifteen frames of the video. The subset of frames are the frames immediately preceding the desired frame to be predicted. For example, the subset of frames of a video having frames 1-100 may be frames 51-61 for a desired prediction of frame 62.

Figure 6:
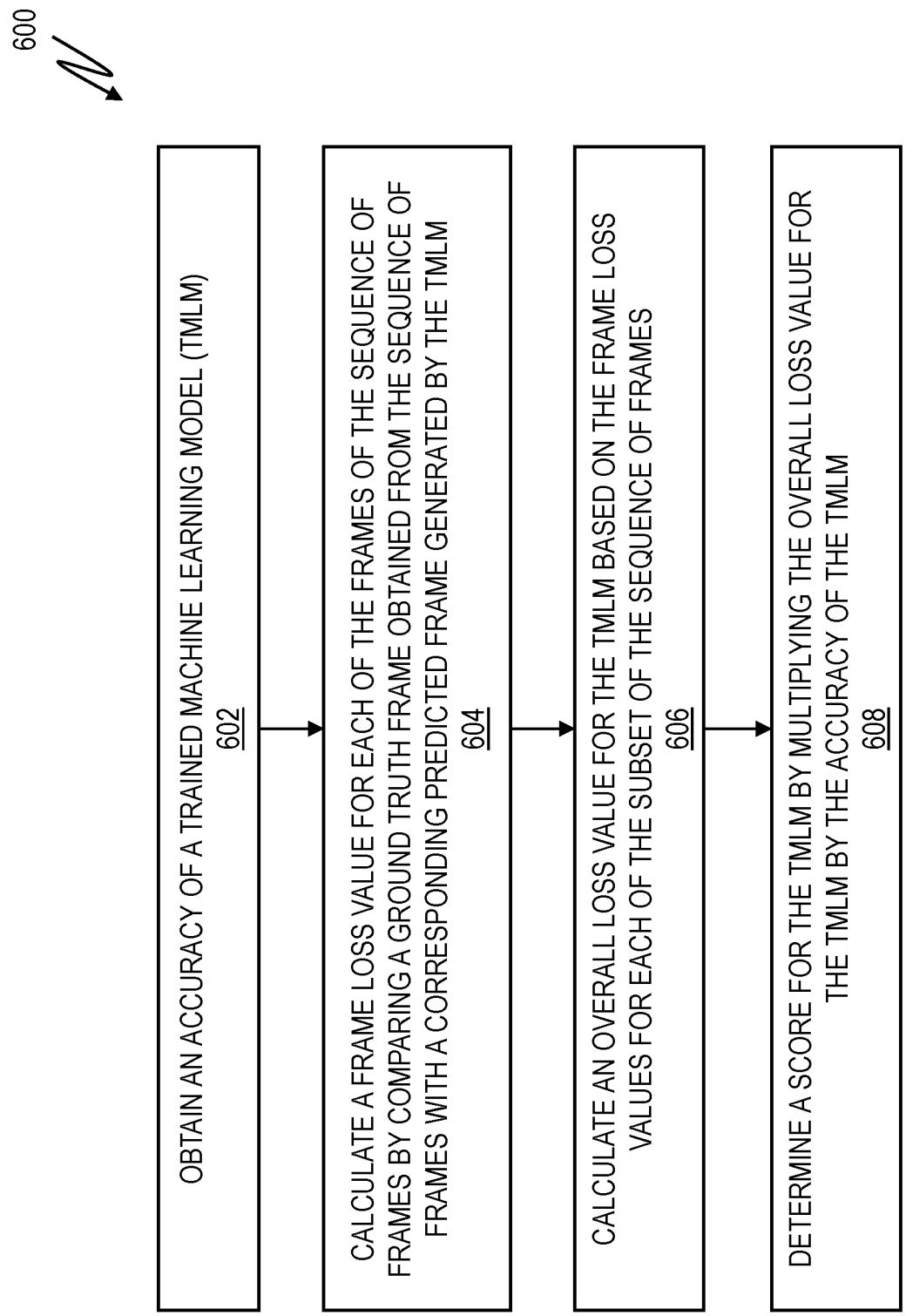
FIG. 6 is a flow diagram illustrating a computer-implemented method for calculating a score for a machine learning model for predicting a next frame for a video in accordance with one or more embodiments of the present invention.

At block 508, the method 500 includes calculating, for the subset of the sequence of frames, a score for each of the plurality of trained machine learning models. In exemplary embodiments, the calculated score for each trained machine learning models reflects how well the trained machine learning models performed in generating frames corresponding to the frames provided in the subset of the sequence of frames. FIG. 6 includes a more detailed discussion of a method for calculating the score for each of the plurality of trained machine learning models.

At block 510, the method 500 includes generating, using one of the plurality of the MLMs having a highest score, the next frame, where the next frame is a frame immediately subsequent to the subset of the sequence of frames. Continuing with the example above, the next frame would be frame 62.

Referring now to FIG. 6, a flow diagram illustrating a computer-implemented method 600 for calculating a score for a trained machine learning model for predicting a next frame for a video in accordance with one or more embodiments of the present invention is shown. In exemplary embodiments, the method 600 is performed by a model scoring engine 416, such as the one shown in FIG. 4. At block 602, the method 600 includes obtaining an accuracy of a trained machine leaning model. Next, as shown at block 604, the method 600 includes calculating a frame loss value for each of the frames of the sequence of frames by comparing a ground truth frame obtained from the sequence of frames with a corresponding predicted frame generated by the trained machine learning model. The method 600 also includes calculating an overall loss value for the trained machine learning model based on the frame loss values for each of the subset of the sequence of frames corresponding to the MLM, as shown at block 606. In various embodiments, the overall loss value may be an average of the frame loss values, a sum of the frame loss values, a weighted average of the frame loss values, or the like. At block 608, the method 600 includes determining a score for the trained machine learning model by multiplying the overall loss value for the trained machine learning model by the accuracy of the trained machine learning model. In one embodiment, the score for the trained machine learning model is determined by multiplying the overall loss value of the trained machine learning model by the accuracy corresponding to the trained machine learning model.

In exemplary embodiments, once the trained machine learning model that is best suited to generate each frame of a video is determined, this information can be included in the metadata of the video. In some cases, this information can be used to select frames that can be intentionally dropped from the video to reduce the file size of the video.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for predicting a next frame for a video, the computer-implemented method comprising:

obtaining the video having a sequence of frames;

obtaining a plurality of machine learning models (MLMs) that are trained to perform next frame prediction;

inputting a subset of the sequence of frames into each of the plurality of MLMs;

calculating, for the subset of the sequence of frames, a score for each of the plurality of MLMs; and generating, using one of the plurality of the MLMs having a highest score, the next frame, wherein the next frame is a frame immediately subsequent to the subset of the sequence of frames.

2. The computer-implemented method of claim 1, wherein each of the plurality of MLMs has an accuracy.

3. The computer-implemented method of claim 2, wherein calculating the score for each of the plurality of MLMs comprises calculating a frame loss value for each of the subset of the sequence of frames by comparing a ground truth frame from the subset of the sequence of frames with a predicted frame generated by a corresponding MLM of the plurality of MLMs.

4. The computer-implemented method of claim 3, wherein calculating the score for each of the plurality of MLMs further comprises calculating an overall loss value for each of the plurality of MLMs based on the frame loss values for each of the subset of the sequence of frames corresponding to the MLM of the plurality of MLMs.

5. The computer-implemented method of claim 4, wherein calculating the score for each of the plurality of MLMs further comprises multiplying the overall loss value corresponding to the MLM of the plurality of MLMs by the accuracy corresponding to the MLM of the plurality of MLMs.

6. The computer-implemented method of claim 3, wherein calculating the score for each of the plurality of MLMs further comprises calculating an overall loss value for each of the plurality of MLMs by summing the frame loss values for each of the subset of the sequence of frames corresponding to the MLM of the plurality of MLMs.

7. The computer-implemented method of claim 1, wherein the plurality of MLMs include a long short-term memory (LSTM) model, a convolutional neural network (CNN) model, and a gated recurrent unit (GRU) model.

8. The computer-implemented method of claim 1, updating a metadata of the video to include an indication of the one of the plurality of the MLMs having the highest score for predicting the next frame.

9. A computer program product having one or more non-transitory computer readable storage media having computer readable program code collectively stored on the one or more non-transitory computer readable storage media, the computer readable program code being executed by a processor of a computer system to cause the computer system to perform operations comprising:

obtaining a video having a sequence of frames;

obtaining a plurality of machine learning models (MLMs) that are trained to perform next frame prediction;

inputting a subset of the sequence of frames into each of the plurality of MLMs;

calculating, for the subset of the sequence of frames, a score for each of the plurality of MLMs; and generating, using one of the plurality of the MLMs having a highest score, a next frame, wherein the next frame is a frame immediately subsequent to the subset of the sequence of frames.

10. The computer program product of claim 9, wherein each of the plurality of MLMs has an accuracy.

11. The computer program product of claim 10, wherein calculating the score for each of the plurality of MLMs comprises calculating a frame loss value for each of the subset of the sequence of frames by comparing a ground truth frame from the subset of the sequence of frames with a predicted frame generated by a corresponding MLM of the plurality of MLMs.

12. The computer program product of claim 11, wherein calculating the score for each of the plurality of MLMs further comprises calculating an overall loss value for each of the plurality of MLMs based on the frame loss values for each of the subset of the sequence of frames corresponding to the MLM of the plurality of MLMs.

13. The computer program product of claim 12, wherein calculating the score for each of the plurality of MLMs further comprises multiplying the overall loss value corresponding to the MLM of the plurality of MLMs by the accuracy corresponding to the MLM of the plurality of MLMs.

14. The computer program product of claim 11, wherein calculating the score for each of the plurality of MLMs further comprises calculating an overall loss value for each of the plurality of MLMs by summing the frame loss values for each of the subset of the sequence of frames corresponding to the MLM of the plurality of MLMs.

15. The computer program product of claim 9, wherein the plurality of MLMs include a long short-term memory (LSTM) model, a convolutional neural network (CNN) model, and a gated recurrent unit (GRU) model.

16. The computer program product of claim 9, updating a metadata of the video to include an indication of the one of the plurality of the MLMs having the highest score for predicting the next frame.

17. A computing system comprising:

a processor;

a memory coupled to the processor; and one or more computer readable storage media coupled to the processor, the one or more computer readable storage media collectively containing instructions that are executed by the processor via the memory to cause the processor to perform operations comprising:

obtaining a video having a sequence of frames;

obtaining a plurality of machine learning models (MLMs) that are trained to perform next frame prediction;

inputting a subset of the sequence of frames into each of the plurality of MLMs;

calculating, for the subset of the sequence of frames, a score for each of the plurality of MLMs; and generating, using one of the plurality of the MLMs having a highest score, a next frame, wherein the next frame is a frame immediately subsequent to the subset of the sequence of frames.

18. The computing system of claim 17, wherein each of the plurality of MLMs has an accuracy.

19. The computing system of claim 18, wherein calculating the score for each of the plurality of MLMs comprises calculating a frame loss value for each of the subset of the sequence of frames by comparing a ground truth frame from the subset of the sequence of frames with a predicted frame generated by a corresponding MLM of the plurality of MLMs.

20. The computing system of claim 19, wherein calculating the score for each of the plurality of MLMs further comprises calculating an overall loss value for each of the plurality of MLMs based on the frame loss values for each of the subset of the sequence of frames corresponding to the MLM of the plurality of MLMs.

* * * * *